United States Patent [19]
Gleason

[11] Patent Number: 5,664,843
[45] Date of Patent: Sep. 9, 1997

[54] VEHICLE SEAT BELT SHOULDER HARNESS ELEVATION DEVICE

[76] Inventor: Gary W. Gleason, 10080 Woodland Pine Cove E., Lakeland, Tenn. 38002

[21] Appl. No.: 638,601

[22] Filed: Apr. 29, 1996

[51] Int. Cl.$^6$ .................................................. B60R 22/00
[52] U.S. Cl. ........................ 297/471; 297/472; 297/482
[58] Field of Search .................................. 297/464, 468, 297/470, 471, 473, 216.1, 487, 482; 280/801.1, 805, 751

[56] References Cited

U.S. PATENT DOCUMENTS

| | | |
|---|---|---|
| 2,443,191 | 6/1948 | Miller ........................................ 297/471 |
| 3,930,665 | 1/1976 | Ikawa ........................................ 280/751 |
| 4,610,463 | 9/1986 | Efrom . |
| 4,678,205 | 7/1987 | Wold ...................................... 297/482 X |
| 4,693,495 | 9/1987 | LaPointe . |
| 4,699,401 | 10/1987 | Saenz . |
| 4,786,080 | 11/1988 | Jay . |
| 4,795,190 | 1/1989 | Weightman et al. . |
| 4,838,378 | 6/1989 | Copes . |
| 4,848,793 | 7/1989 | Huspen et al. . |
| 5,161,824 | 11/1992 | Li . |
| 5,213,366 | 5/1993 | Sweger, Jr. . |

FOREIGN PATENT DOCUMENTS 74747  4/1988  Japan ..................................... 297/482

*Primary Examiner*—Milton Nelson, Jr.
*Attorney, Agent, or Firm*—Walker, McKenzie & Walker, P.C.

[57] ABSTRACT

An apparatus for biasing a portion of a seat belt shoulder harness away from a portion of a human chest. The apparatus comprises a body portion including a first end portion, a second end portion, and an intermediate portion. The body portion is deformable between a first and a second position. In the first position the intermediate portion is substantially non-coplanar with the first and second end portions, and in the second position, the intermediate portion is substantially coplanar with the end portions. The body portion is biased in the first position and is secured to the seat belt shoulder harness.

14 Claims, 2 Drawing Sheets

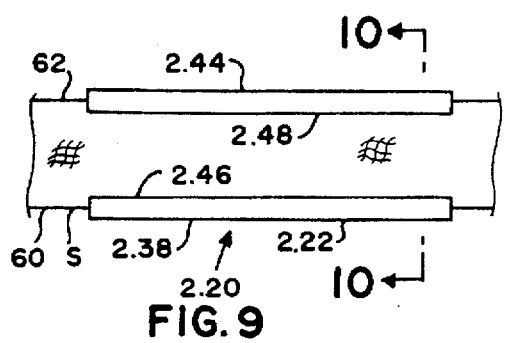
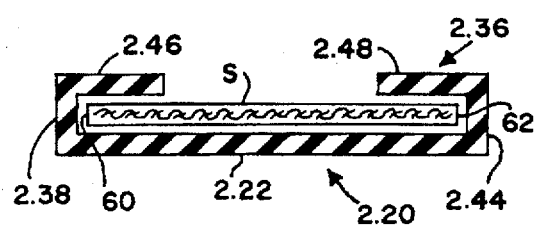
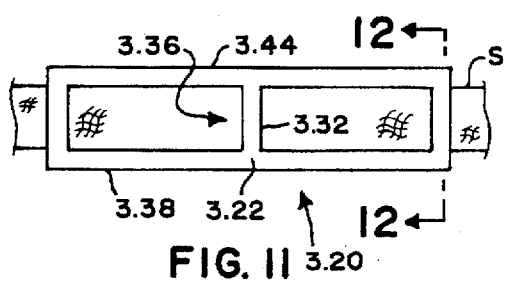
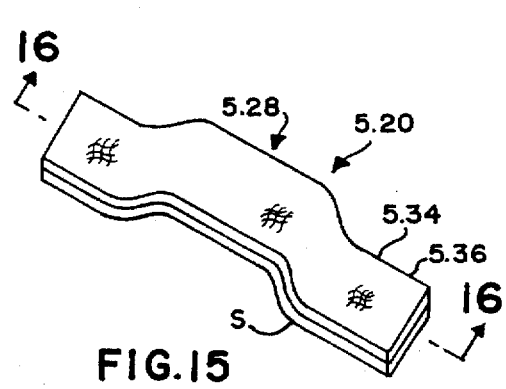
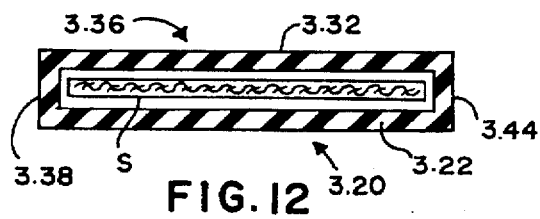
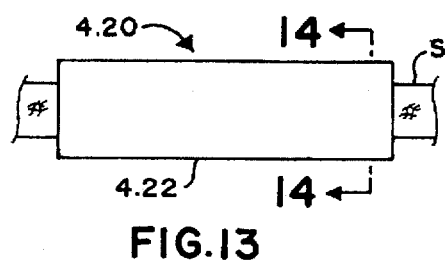
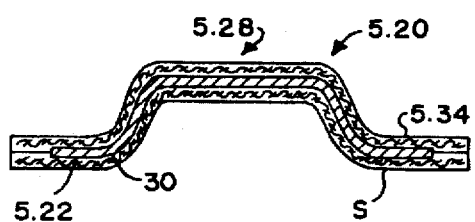
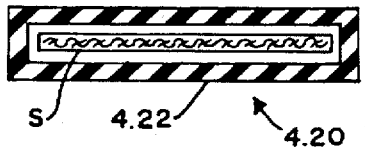

VEHICLE SEAT BELT SHOULDER HARNESS ELEVATION DEVICE

BACKGROUND OF THE INVENTION

1. Field of the Invention

The present invention relates, in general, to vehicle seat belt shoulder harness apparatus, and in particular, to an apparatus which will increase the comfort level of a user wearing a seat belt shoulder harness.

2. Information Disclosure Statement

It is often desired to increase the comfort level of a user of a vehicle's seat belt shoulder harness. Well-known solutions for this problem include the placement of pads and cushions around the seat belt shoulder harness. While shields and vests may affect the comfort level of the user, prior art devices utilizing shields and/or vests were more concerned with safety, and specifically with distributing the forces sustained by the user upon an automobile collision.

None of the prior art is directed toward an apparatus which will increase the comfort of the user and decrease wrinkling of the user's clothes by lifting a portion of a seat belt shoulder harness away from the user, while still allowing the seat belt shoulder harness to move back against the user so as to restrain the user upon the occurrence of an automobile collision or a sudden stop.

A preliminary patentability search in Class 280, subclasses 801.1 and 808, and Class 207, subclass 482, produced the following patents, some of which may be relevant to the present invention: Efrom, U.S. Pat. No. 4,610,463, issued Sep. 9, 1986; LaPointe, U.S. Pat. No. 4,693,495, issued Sep. 15, 1987; Saenz, U.S. Pat. No. 4,699,401, issued Oct. 13, 1987; Jay, U.S. Pat. No. 4,786,080, issued Nov. 22, 1988; Weightman et al., U.S. Pat. No. 4,795,190, issued Jan. 3, 1989; Copes, U.S. Pat. No. 4,838,378 issued Jun. 13, 1989; Huspen et al., U.S. Pat. No. 4,848,793, issued Jul. 18, 1989; Li, U.S. Pat. No. 5,161,824, issued Nov. 10, 1992; and Sweger, Jr., U.S. Pat. No. 5,213,366, issued May 25, 1993. None of these references, either singly or in combination, disclose or suggest the present invention.

SUMMARY OF THE INVENTION

The present invention is an apparatus for biasing a portion of a seat belt shoulder harness away from a portion of a human user's chest. The apparatus comprises a body portion including a first end portion, a second end portion, and an intermediate portion. The body portion is deformable between a first raised position and a second non-raised position. In the first position, the intermediate portion is substantially non-coplanar with the first and second end portions, and in the second position, the intermediate portion is substantially coplanar with the first and second end portions. The body portion of the apparatus is biased into the first position and is secured to the seat belt shoulder harness.

It is an object of the present invention to provide an apparatus that will encourage people to wear seat belts by increasing the level of comfort to the user and by decreasing the wrinkling of the user's clothing.

It is another object of the present invention to provide an embodiment of the apparatus that can be removably attached to the seat belt shoulder harness.

It is another object of the present invention to provide another embodiment of the apparatus that can be non-removably attached to the seat belt shoulder harness.

It is a further object of the present invention to provide still another embodiment of the apparatus that is integral, one piece, with the seat belt shoulder harness.

BRIEF DESCRIPTION OF THE DRAWINGS

FIG. 9 is a front view of a second preferred embodiment of the present invention showing shoulder portions extending inwardly from the side portions so as to entrap the seat belt shoulder harness.

FIG. 10 is a sectional view of a second preferred embodiment of the present invention taken substantially along the line 10—10 of FIG. 9.

FIG. 11 is a front view of a third preferred embodiment of the present invention showing rib portions extending from the first side portion to the second side portion so as to entrap the seat belt shoulder harness.

FIG. 12 is a sectional view of a third preferred embodiment of the present invention taken substantially along the line 12—12 of FIG. 11.

FIG. 13 is a front view of a fourth preferred embodiment in which the body portion circumferentially surrounds the seat belt shoulder harness.

FIG. 14 is a sectional view of a fourth preferred embodiment of the present invention taken substantially along the line 14—14 of FIG. 13, showing the body portion circuraferentially surrounding the seat belt shoulder harness.

FIG. 15 is a perspective view of a fifth preferred embodiment of the present invention showing the body portion sandwiched between a belt layer and the seat belt shoulder harness.

FIG. 16 is a sectional view of a fifth preferred embodiment of the present invention taken substantially along the line 16—16 of FIG. 15.

DESCRIPTION OF THE PREFERRED EMBODIMENT

Figure 1:
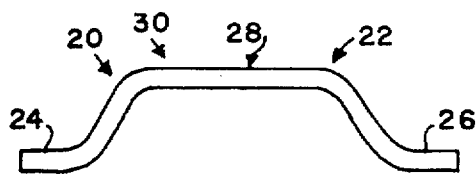
FIG. 1 is a general depiction of a side view of the present invention showing the body portion biased so that the intermediate portion is substantially non-coplanar with the end portions.
Figure 2:
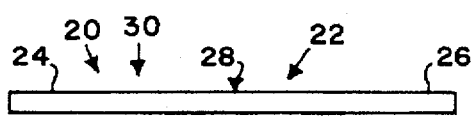
FIG. 2 is a general depiction of a side view of the present invention showing the body portion deformed so that the intermediate portion is substantially coplanar with the end portions.

Referring to FIGS. 1 and 2, apparatus 20 is seen to comprise a body portion 22 including a first end portion 24, a second end portion 26, and an intermediate portion 28. The body portion 22 is deformable between a first position and a second position. FIG. 1 shows a general depiction of a side view of the present invention with the body portion 22 in the first position in which the intermediate portion 28 is substantially non-coplanar with the first end portion 24 and the second end portion 26. The amount of non-coplanarity is exaggerated for illustration purposes and is not to be construed as a limitation. FIG. 2 shows a general depiction of a side view of the present invention with the body portion 22 in the second position in which the intermediate portion 28 is substantially coplanar with the first end portion 24 and the second end portion 26. The body portion 22 includes biasing means 30 for biasing the body portion 22 in the first position. The body portion 22 also includes securing means, hereinafter described for various preferred embodiments, for securing the body portion 22 to the seat belt shoulder harness S.

Four preferred versions of the biasing means are described herein, but the general appearance of the apparatus 20 is not dependent upon the particular implementation for any given version of the biasing means. Accordingly, FIGS. 1-4 refer generally to all versions of the biasing means and to all preferred embodiments of the apparatus 20, and those common elements will be referenced by similar identifying reference designators without a prefix (e.g., "20" rather than "1.20", "2.20", etc.). It shall be understood that the various versions of the biasing means differ primarily only in the materials used to construct the body portion of the embodiments shown in FIGS. 6-16, and that any of the embodiments shown in FIGS. 6-16 may be constructed using any of the versions of biasing means now described.

Figure 3:
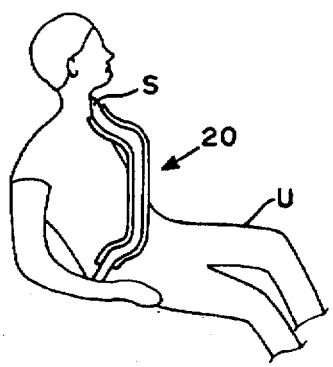
FIG. 3 is a view of the environment of the present invention, showing the apparatus as worn by a user.
Figure 4:
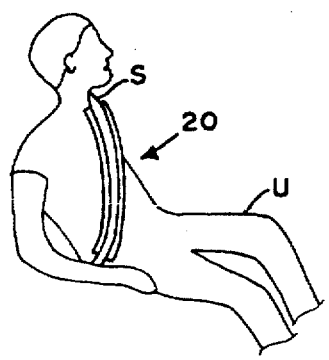
FIG. 4 is a view of the environment of the present invention, showing the deformed apparatus as worn by a user during an automobile collision or a sudden stop.

As shown in FIGS. 1-4, all versions of biasing means 30 bias the body portion 22 into a first position so that the intermediate portion 28 of apparatus 20 is substantially non-coplanar with the first 24 and second 26 end portions. As shown in FIG. 3, this causes a portion of the seat belt shoulder harness S to be lifted away from a portion of the user's chest and increases comfort to the user U. During an automobile collision or a sudden stop, the seat belt shoulder harness S acts to restrain the user U of the seat belt shoulder harness S in a manner well-known to those skilled in the art. The user U will be thrust against the seat belt shoulder harness S and apparatus 20, as shown in FIG. 4, resulting in a force being applied to the biasing means 30.

In the first preferred version of the biasing means 30, body portion 22 comprises a deformable, shape restoring material that can deform in response to applied force and will allow the body portion 22 to deform into the second position shown in FIG. 2 so that the intermediate portion 28 is substantially coplanar with the first 24 and second 26 end portions. In this manner, the previously lifted-away portion of the seat belt shoulder harness S moves back against the user's chest as the user is thrust against the shoulder harness and restrained by the shoulder harness, thereby preventing forward movement as shown in FIG. 4. After an automobile collision or a sudden stop, these forward forces are no longer present, and the shape-restoring property of the biasing means 30 will again restoringly bias the body portion 22 back into the first position in which the intermediate portion 28 is substantially non-coplanar with the first 24 and second 26 end portions, as shown in FIG. 1. As shown in FIG. 3, this causes a portion of the seat belt shoulder harness S to return to the position where it is lifted away from a portion of the user's chest, again resulting in increased comfort to the user U. The body portion 22 will remain in the first position until the biasing means 30 is again subjected to a force caused during another automobile collision or sudden stop. Appropriate deformable, shape-restoring materials for this first version of biasing means 30 include preformed rubber, metal, polyethylene, other plastic materials, or any other well-known and similarly deformable and shape-restoring material, as will now be apparent to those skilled in the art.

In the second preferred version of the biasing means 30, body portion 22 comprises a deformable shape-retaining material which will allow the biasing means 30 to be manually restored so as to bias the body portion 22 into the first position following a deformation into the second position. As with the first (deformable, shape-restoring) version of biasing means 30, this second (deformable, shape-retaining) version of biasing means 30 biases the body portion 22 into the first position so that the intermediate portion 28 is substantially non-coplanar with the first 24 and second 26 end portions, as shown generally in FIG. 1. When subjected to the force caused during an automobile collision or a sudden stop, the second version of biasing means 30 will deform and will allow the body portion 22 to deform into the second position so that the intermediate portion 28 is substantially coplanar with the first 24 and second 26 end portions, as shown in FIG. 2. The shape-retaining property of the biasing means 30 will now cause the intermediate portion 28 to remain substantially coplanar with the first 24 and second 26 end portions. However, the materials used for this second version of biasing means 30 also include the property of being manually restorable from the second position into the first position. The user U can manually restore the biasing means 30 so that the body portion 22 is biased in the first position by bendingly applying outward pressure to the intermediate portion 28 with respect to the first 24 and second 26 end portions. After being manually restored, the shape-retaining property of the biasing means 30 will cause the intermediate portion 28 to remain substantially non-coplanar with the first 24 and second 26 end portions, as shown in FIGS. 1 and 3, until again subjected to a force caused during another automobile collision or a sudden stop. Appropriate well-known deformable shape-retaining materials for this second version of biasing means 30 include bendable metals, or any other similar well-known and manually deformable material, as will now be apparent to those skilled in the art.

In the third preferred version of the biasing means 30, body portion 22 comprises a frangible material which has a certain predetermined stress threshold, and in which the material will fracture so as to deform the body portion 22 into the second position when subjected to a stress which is above the certain predetermined stress threshold. This certain predetermined stress threshold is selected to be high enough so that the stress associated with the installation and normal use of the apparatus 20 will not cause the material to fracture. However, the certain predetermined stress threshold is selected to be low enough so that when subjected to a force caused by an automobile collision or a sudden stop, the material will fracture. After being subjected to such a stress, the body portion 22 remains unbiased in substantially the second position as shown in FIG. 2 because of the fracture of the biasing means, and does not return to the first position when the force causing the stress is removed. When using this third version of the biasing means 30, either the whole apparatus 20 or the biasing means 30 will have to be replaced after an automobile collision or a sudden stop creates a stress which is above the certain predetermined stress threshold. Any well-known material which can be formed so as to have the required predetermined stress threshold can be used. Appropriate well-known materials for this third version of biasing means 30 include metal, plastic materials, or any other suitable well-known frangible material that will break if stressed past a certain predetermined threshold of stress, as will now be apparent to those skilled in the art.

Figure 5:
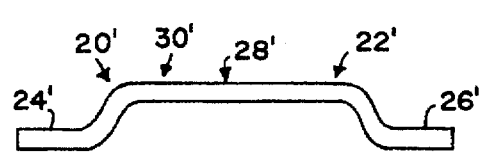
FIG. 5 is a general depiction of a side view of the present invention showing an adjustable alternate version of the biasing means shown adjusted in a first adjustment state.
Figure 5A:
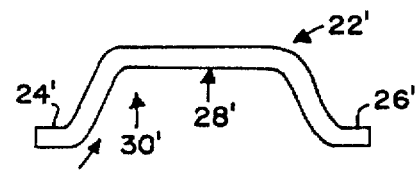
FIG. 5A is a general depiction of a side view of the present invention showing an adjustable alternate version shown adjusted in a second adjustment state.

FIG. 5 and 5A show a fourth preferred version 30' of the biasing means. Identifying reference designators are marked similarly to those of FIGS. 1–4 except for the addition of a prime, e.g., 20'. It shall be understood that many aspects of all versions of biasing means 30 and 30' are substantially the same, and only the differences of this fourth version will be treated in detail, it being understood that similar structural features of all the versions perform similar functions.

Referring to FIGS. 5 and 5A, in the fourth preferred version 30' of the biasing means, body portion 22' comprises a deformable shape-retaining material that allows the biasing means to be manually restored so as to bias the body portion 22' into the first position following deformation into the second position. This fourth version 30' of the biasing means operates similarly to the second preferred version of the biasing means. In addition, the material of this fourth version 30' is pliably adjustable so that the user U can adjust the amount of non-coplanarity of the intermediate portion 28' with respect to the first end portion 24' and the second end portion 26'. This allows the user U to bendingly custom shape the body portion 22' for maximum comfort. Appropriate well-known materials for this fourth version of the biasing means include bendable metals or any other similar well-known manually-deformable pliable material, as will now be apparent to those skilled in the art. FIG. 5 shows the apparatus 20' comprising the fourth preferred version 30' of the biasing means biased into the first position, with the non-coplanarity of the intermediate portion 28' with respect to the first end portion 24' and the second end portion 26' shown adjusted to a first degree of adjustment amount and shape. FIG. 5A also shows the apparatus 20' comprising the fourth preferred version 30' of the biasing means but instead being biased into a different first position than that shown in FIG. 5, and with the non-coplanarity of the intermediate portion 28' with respect to the first end portion 24' and the second end portion 26' being adjusted by a second amount and shape which differs from that shown in FIG. 5. In this manner, users can selectively and deformably adjust the apparatus so as to permit a varying amount of non-coplanarity of intermediate portion 28' with respect to first and second end portions 24' and 26' in order to accommodate differing breast sizes, jewelry, etc. In other respects, the fourth preferred version 30' of the biasing means operates similarly and is constructed similarly to the second preferred version of the biasing means hereinbefore described.

When any version of the biasing means 30 or 30' comprises a metal or plastic material, it may be covered with a soft rubber, nylon, or fabric material in order to increase the comfort to the user U and to protect the seat belt shoulder harness S from deterioration.

FIGS. 6–16 show five preferred embodiments of apparatus 20. Each preferred embodiment includes a different securing means (denoted by a reference numeral suffix of 36) for securing the body portion 22 to the seat belt shoulder harness S, and it shall be understood that the various preferred embodiments can be constructed of the various materials described hereinabove so as to employ the various versions of biasing means 30 or 30'. Identifying reference designators for all of the preferred embodiments are marked similarly except for the prefix "1.", "2.", "3.", "4.", or "5.". It shall be understood that many aspects of the five embodiments are substantially the same, and only the differences will be treated in detail, it being understood that similar structural features of all the embodiments perform similar functions.

Figure 6:
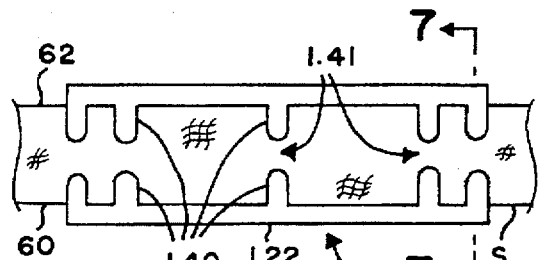
FIG. 6 is a front view of a first preferred embodiment of the present invention showing finger portions extending inwardly from the side portions so as to entrap the seat belt shoulder harness.
Figure 7:
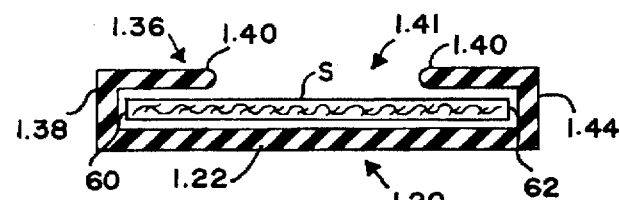
FIG. 7 is a sectional view of a first preferred embodiment of the present invention taken substanatially along the line 7—7 of FIG. 6.
Figure 8:
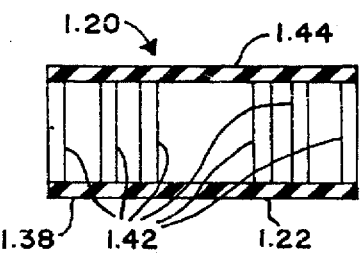
FIG. 8 is a front view of a first embodiment of the present invention showing the apparatus without the seat belt shoulder harness in place and, for illustration purposes only, omitting the finger portions to show a body portion which includes a solid portion and includes rib portions.

FIGS. 6, 7, and 8 show a first preferred embodiment of the present invention. The body portion 1.22 includes securing means 1.36 for securing the body portion 1.22 to the seat belt shoulder harness S. The body portion 1.22 includes at least one side portion 1.38, and securing means 1.36 includes at least one finger portion 1.40 extending inwardly from the first side portion 1.38 and adapted to entrap the seat belt shoulder harness S. Body portion 1.22 can include first 1.38 and second 1.44 side portions, and securing means 1.36 can include a plurality of finger portions 1.40 extending inwardly from the first 1.38 and second 1.44 side portions adapted to entrap the seat belt shoulder harness S from both sides. FIG. 7 shows a sectional view of the first preferred embodiment of the present invention taken substantially along line 7—7 of FIG. 6, and, for purposes of illustration, shows an exaggerated gap or space between the apparatus 1.20 and the seat belt shoulder harness S. First side portion 1.38, and, if included, second side portion 1.44, also function to raise the finger portions 1.40 above the thickness of the seat belt shoulder harness S, as can be seen by referring to FIG. 7. The first 1.38 and second 1.44 side portions can be discontinuous, existing only at the locations of the finger portions 1.40, or can be continuous along the length of the body portion 1.22. The first preferred embodiment of the apparatus 1.20 can be removably attached to the seat belt shoulder harness S, and allows for easy installation and replacement of the apparatus 1.20. The first preferred embodiment of the present invention can be constructed with any one of the four versions of biasing means 30 or 30', previously described.

FIG. 8 shows a front view of the first preferred embodiment of the present invention without the seat belt shoulder harness S in place and without the finger portions 1.40 so that the front of the body portion 1.22 can be seen clearly. The body portion 1.22 can be constructed to have a solid planar portion joining side portions 1.38 and 1.44, or preferably is constructed as shown in FIG. 8 with a plurality of transverse ribs 1.42 joining side portions 1.38 and 1.44 for economy of material. Preferably, the body portion 1.22 is constructed to have six transverse ribs 1.42 joining side portions 1.38 and 1.44; a transverse rib 1.42 at each end of the body portion 1.22 and a transverse rib 1.42 at each bend of the body portion 1.22. Ribs 1.42 are understood to cooperate with securing means 1.36 in entrappingly securing body portion 1.22 to the seat belt shoulder harness S.

To use the first preferred embodiment 1.20 of the present invention, the apparatus is attached to a seat belt shoulder harness S by first sliding one edge 60 of seat belt shoulder harness S through the inter-finger gap 1.41 and under the finger portions 1.40 on one side of apparatus 1.20, and then sliding the other edge 62 of seat belt shoulder harness S through the inter-finger gap 1.41 and under the finger portions 1.40 on the other side of apparatus 1.20 so as to entrappingly secure apparatus 1.20 to seat belt shoulder harness S. The apparatus 1.20 can then be positioned longitudinally along seat belt shoulder harness S as desired, and the seat belt shoulder harness S can be secured across the chest of user U in a manner well-known to those skilled in the art. The apparatus 1.20 then lifts the seat belt shoulder harness away from the user's chest in a manner heretofore described.

A second preferred embodiment 2.20 of the present invention is shown in FIGS. 9 and 10. Identifying reference designators for this second embodiment are marked similarly to the other embodiments, except with the prefix "2.". It shall be understood that many aspects of all embodiments are substantially the same, and only the differences will be treated in detail, it being understood that similar structural features of all the embodiments perform similar functions. The second embodiment 2.20 includes a body portion 2.22 having a first side portion 2.38 and a second side portion 2.44. Securing means 2.36 includes a first shoulder portion 2.46 extending inwardly from the first side portion 2.38 and a second shoulder portion 2.48 extending inwardly from the second side portion 2.44, with both shoulders being adapted to entrap the seat belt shoulder harness S as shown. It shall be understood that, for purposes of illustration, FIG. 10 shows an exaggerated gap or space between the apparatus 2.20 and the seat belt shoulder harness S. The function of the first 2.38 and second 2.44 side portions is to raise the first 2.46 and second 2.48 shoulder portions, respectively, just above the thickness of the seat belt shoulder harness S so that the body portion 2.22 entraps and is secured to the seat belt shoulder harness S, and first 2.38 and second 2.44 side portions can be continuous or discontinuous along the length of the body portion 2.22. The second preferred embodiment of the apparatus 2.20 can be removably attached to the seat belt shoulder harness S, and allows for easy installation and replacement of the apparatus 2.20. The second preferred embodiment of the present invention may include any one of the four versions of the biasing means 30 or 30', previously described.

To use the second preferred embodiment 2.20 of the present invention, the apparatus is attached to a seat belt shoulder harness S by first sliding one edge 60 of seat belt shoulder harness S under the shoulder portion 2.46 on one side of apparatus 2.20 and then sliding the other edge 62 of seat belt shoulder harness S under the shoulder portion 2.48 on the other side of apparatus 2.20 so as to entrappingly secure apparatus 2.20 to seat belt shoulder harness S. The apparatus 2.20 can then be positioned longitudinally along seat belt shoulder harness S as desired, and the seat belt shoulder harness S can be secured across the chest of user U in a manner well-known to those skilled in the art. The apparatus 2.20 then lifts the seat belt shoulder harness away from the user's chest in a manner heretofore described.

A third preferred embodiment of the present invention is shown in FIGS. 11 and 12. Identifying reference designators are marked similarly to the other embodiments, except with the prefix "3.". It shall be understood that many aspects of the third embodiment are substantially the same as the other embodiments, and only the differences will be treated in detail, it being understood that similar structural features of all the embodiments perform similar functions. The third preferred embodiment 3.20 includes a body portion 3.22 having a first side portion 3.38 and a second side portion 3.44, and further includes securing means 3.36 having at least one transverse rib portion 3.32 extending from the first side portion 3.38 to the second side portion 3.44 adapted to entrap the seat belt shoulder harness S. It shall be understood that the sectional view shown in FIG. 12, for purposes of illustration, shows an exaggerated gap or space between the apparatus 3.20 and the seat belt shoulder harness S. Side portions 3.38, 3.44 function to raise a transverse rib portion 3.32 just above the thickness of the seat belt shoulder harness S so that the body portion 3.22 is secured to the seat belt shoulder harness S. The side portions 3.38, 3.44 can be discontinuous, existing only at the location of a rib portion 3.32, or can be continuous along the entire length of the body portion 3.22. Because of its circumferential entrapment of seat belt shoulder harness S, this third embodiment 3.20 of the apparatus cannot be easily removed from the seat belt shoulder harness S. This third embodiment 3.20 can be constructed to include any one of the four versions of the biasing means 30 or 30', previously described.

To use the third preferred embodiment 3.20 of the present invention, the apparatus is attached to a seat belt shoulder harness S by longitudinally threading one end of seat belt shoulder harness S through apparatus 3.20 so as to entrappingly secure apparatus 3.20 to seat belt shoulder harness S as shown. The apparatus 3.20 can then be positioned longitudinally along seat belt shoulder harness S as desired, and the seat belt shoulder harness S can be secured across the chest of user U in a manner well-known to those skilled in the art. The apparatus 3.20 then lifts the seat belt shoulder harness away from the user's chest in a manner heretofore described.

A fourth preferred embodiment 4.20 of the present invention is shown in FIGS. 13 and 14. Identifying reference designators are marked similarly to the other embodiments, except with the prefix "4.". It shall be understood that many aspects of all embodiments are substantially the same, and only the differences will be treated in detail, it being understood that similar structural features of all the embodiments perform similar functions. In this fourth preferred embodiment 4.20, the body portion 4.22 circumferentially surrounds the seat belt shoulder harness S so as to entrap the seat belt shoulder harness S and secure the body portion 4.22 to the seat belt shoulder harness S. It shall be understood that, for purposes of illustration, FIG. 14 shows an exaggerated gap or space between the body portion 4.22 and the seat belt shoulder harness S. This fourth preferred embodiment is similar to the third preferred embodiment except that, rather than having ribs as in the third embodiment, the fourth embodiment has a solid back and front circumferentially surrounding seat belt shoulder harness S. Because of its circumferential entrapment of seat belt shoulder harness S, this fourth embodiment 4.20 of the apparatus cannot be easily removed from the seat belt shoulder harness S. This fourth embodiment can be constructed to include any one of the four versions of the biasing means 30 or 30', previously described.

To use the fourth preferred embodiment 4.20 of the present invention, the apparatus is attached to a seat belt shoulder harness S by longitudinally threading one end of seat belt shoulder harness S through apparatus 4.20 so as to entrappingly secure apparatus 4.20 to seat belt shoulder harness S as shown. The apparatus 4.20 can then be positioned longitudinally along seat belt shoulder harness S as desired, and the seat belt shoulder harness S can be secured across the chest of user U in a manner well-known to those skilled in the art. The apparatus 4.20 then lifts the seat belt shoulder harness away from the user's chest in a manner heretofore described.

A perspective view of a fifth preferred embodiment of the present invention is shown in FIGS. 15 and 16. Identifying reference designators are marked similarly to the other embodiments, except with the prefix "5.". It shall be understood that many aspects of all embodiments are substantially the same, and only the differences will be treated in detail, it being understood that similar structural features of all of the embodiments perform similar functions. Securing means 5.36 comprises a belt layer 5.34 secured to the seat belt shoulder harness S. The body portion 5.22 is sandwiched between the belt layer 5.34 and the seat S belt shoulder harness S. The preferred manner of securing the belt layer 5.34 to the seat belt shoulder harness S is by sewing, but riveting with plastic rivets and other equivalent methods well known to those skilled in the art could be used as well. This fifth embodiment can be constructed to include any one of the four versions of the biasing means 30 or 30', previously described. However, when this embodiment is constructed using the third preferred version of the biasing means having a frangible material with a certain predetermined stress threshold, the belt layer 5.34 must be removably attached to the seat belt shoulder harness S, so that the biasing means can be replaced upon fracture.

To use the fifth preferred embodiment 5.20 of the present invention, the apparatus is attached to a seat belt shoulder harness S by sandwiching body portion 5.22 in position between belt layer 5.34 and seat belt shoulder harness S, then sewing belt layer 5.34 to seat belt shoulder harness S so as to secure apparatus 5.20 thereto, or by riveting apparatus 5.20 in position to seat belt shoulder harness S. The apparatus 5.20 then lifts the seat belt shoulder harness away from the user's chest in a manner heretofore described.

Although the present invention has been described and illustrated with respect to a number of preferred embodiments and preferred uses, it is not to be so limited since modifications and changes can be made therein which are within the full intended scope of the invention.

I claim:

1. An apparatus for biasing a portion of a seat belt shoulder harness away from a portion of a human chest; said apparatus comprising:

(a) a body portion including a first end portion, a second end portion, and an intermediate portion; each one of said first end portion, said second end portion, and said intermediate portion having a topside and an underside: said body portion being deformable between:

i. a first position in which said topside and said underside of said intermediate portion are substantially non-coplanar with said topside and said underside of said first and second end portions, and ii. a second position in which said topside and said underside of said intermediate portion are substantially coplanar with said topside and said underside of said end portions; said body portion further including biasing means for biasing said body portion in said first position; and (b) securing means for securing said body portion to the seat belt shoulder harness.

2. The apparatus of claim 1 in which said biasing means comprises a deformable, shape-restoring material.

3. The apparatus of claim 2 in which said body portion further includes at least one side portion and in which said securing means includes at least one finger portion extending inwardly from said side portion and adapted to entrap the seat belt shoulder harness.

4. The apparatus of claim 2 in which said body portion further includes a first and a second side portion and in which said securing means includes a first shoulder portion extending inwardly from said first side portion and a second shoulder portion extending inwardly from said second side portion and adapted to entrap the seat belt shoulder harness.

5. The apparatus of claim 2 in which said body portion further includes a first and a second side portion and in which said securing means includes at least one rib portion extending from said first side portion to said second side portion and adapted to entrap the seat belt shoulder harness.

6. The apparatus of claim 2 in which said securing means circumferentially surrounds the seat belt shoulder harness so as to entrap the seat belt shoulder harness and secure said body portion to the seat belt shoulder harness.

7. The apparatus of claim 2 in which said securing means comprises a belt layer adapted to be secured to the seat belt shoulder harness and in which said body portion is sandwiched between said belt layer and the seat belt shoulder harness.

8. The apparatus of claim 1 in which said biasing means comprises a deformable shape-retaining material, and in which said biasing means can be deformably restored so as to bias said body portion into said first position after being deformed into said second position.

9. The apparatus of claim 8 in which said biasing means is selectively deformably adjustable so as to permit a varying amount of non-coplanarity of said intermediate portion with respect to said first end portion and said second end portion.

10. The apparatus of claim 8 in which said body portion further includes at least one side portion and in which said securing means includes at least one finger portion extending inwardly from said side portion and adapted to entrap the seat belt shoulder harness.

11. The apparatus of claim 8 in which said body portion further includes a first and a second side portion and in which said securing means includes a first shoulder portion extending inwardly from said first side portion and a second shoulder portion extending inwardly from said second side portion and adapted to entrap the seat belt shoulder harness.

12. The apparatus of claim 8 in which said body portion further includes a first and a second side portion and in which said securing means includes at least one rib portion extending from said first side portion to said second side portion and adapted to entrap the seat belt shoulder harness.

13. The apparatus of claim 8 in which said securing means circumferentially surrounds the seat belt shoulder harness so as to entrap the seat belt shoulder harness and secure said body portion to the seat belt shoulder harness.

14. The apparatus of claim 1 in which said biasing means comprises a frangible material having a certain predetermined stress threshold, and in which said frangible material will fracture so as to deform said body portion into said second position when subjected to a stress which is above said certain predetermined stress threshold.

* * * * *